US010972983B2

(12) United States Patent
Killen et al.

(10) Patent No.: US 10,972,983 B2
(45) Date of Patent: *Apr. 6, 2021

(54) METHOD AND APPARATUS FOR REDUCING ENERGY CONSUMPTION

(71) Applicant: Nokia Solutions and Networks Oy, Espoo (FI)

(72) Inventors: Andrew Killen, Vernon Hills, IL (US); Alex Hirsbrunner, Bloomingdale, IL (US); Kirk Ingemunson, Arlington Heights, IL (US); William Walsh, Wilmington, NC (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/075,752

(22) PCT Filed: Feb. 2, 2017

(86) PCT No.: PCT/EP2017/052199
§ 371 (c)(1),
(2) Date: Aug. 6, 2018

(87) PCT Pub. No.: WO2017/140505
PCT Pub. Date: Aug. 24, 2017

(65) Prior Publication Data
US 2019/0053164 A1    Feb. 14, 2019

Related U.S. Application Data

(63) Continuation of application No. 15/046,130, filed on Feb. 17, 2016, now Pat. No. 10,492,145.

(51) Int. Cl.
*H04W 52/02* (2009.01)
*G01K 1/022* (2021.01)
*G01K 3/10* (2006.01)

(52) U.S. Cl.
CPC ...... *H04W 52/0261* (2013.01); *H04W 52/0206* (2013.01); *G01K 1/022* (2013.01);
(Continued)

(58) Field of Classification Search
CPC ......... H04W 52/0261; H04W 52/0206; G01K 1/022; G01K 3/10; G01V 2200/12; Y02D 70/164; Y02D 70/1262
See application file for complete search history.

(56) References Cited

U.S. PATENT DOCUMENTS 7,593,738 B2    9/2009 Anderson .................. 455/456.1
8,605,543 B2   12/2013 Ray
(Continued)

FOREIGN PATENT DOCUMENTS

CN    102608629 A    7/2012
CN    105101404 A   11/2015
(Continued)

*Primary Examiner* — Harry H Kim
(74) *Attorney, Agent, or Firm* — Harrington & Smith (57) ABSTRACT

A method and apparatus may include activating, by a network node, power of a global-positioning-system receiver or power of an active antenna of the global-positioning-system receiver. The apparatus uses the global-positioning-system receiver to perform synchronization of the apparatus. The method may include receiving at least one measurement, wherein the at least one measurement includes real-time, predictive, or historic data. The method may also include determining a holdover duration based on the at least one measurement. The holdover duration corresponds to a length of time where the power of the global-positioning-system receiver or the power of the active antenna is to be turned off. The method may also include deactivating the power of the global-positioning-system receiver or the power of the active antenna for the holdover duration.

19 Claims, 6 Drawing Sheets

(52) U.S. Cl.
    CPC ............ *G01K 3/10* (2013.01); *G01V 2200/12* (2013.01); *Y02D 30/70* (2020.08)

(56) References Cited

U.S. PATENT DOCUMENTS

| | | | |
|---|---|---|---|
| 9,198,604 B2 | 12/2015 | Venkatraman et al. | 342/357.31 |
| 2001/0019316 A1 | 9/2001 | Hasegawa | 342/357.12 |
| 2009/0190542 A1* | 7/2009 | Akiyama | H04W 56/002 370/329 |
| 2012/0188123 A1 | 7/2012 | Baba | 342/357.63 |
| 2012/0190380 A1* | 7/2012 | Dupray | G01S 5/021 455/456.1 |
| 2014/0275850 A1 | 9/2014 | Venkatraman et al. | 600/301 |
| 2015/0025831 A1* | 1/2015 | Mourey | G01V 1/003 702/130 |
| 2015/0103712 A1* | 4/2015 | Hong | H04W 52/0203 370/311 |
| 2015/0301192 A1 | 10/2015 | Leclercq et al. | |
| 2015/0341884 A1* | 11/2015 | Das | H04W 52/0216 370/311 |
| 2017/0086164 A1* | 3/2017 | Park | G01S 19/13 |
| 2018/0376484 A1* | 12/2018 | Beale | H04W 24/10 |

FOREIGN PATENT DOCUMENTS

| | | |
|---|---|---|
| EP | 2 831 696 | 10/2013 |
| KR | 20040072955 A | 8/2004 |
| WO | WO 2014/033500 A1 | 3/2014 |

\* cited by examiner

METHOD AND APPARATUS FOR REDUCING ENERGY CONSUMPTION

This patent application is a U.S. National Stage application of International Patent Application Number PCT/EP2017/052199 filed Feb. 2, 2017, which claims priority to U.S. application Ser. No. 15/046,130 filed Feb. 17, 2016 which are hereby incorporated by reference in their entireties.

BACKGROUND

Field

Certain embodiments of the present invention relate to reducing energy consumption.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include activating, by a network node, power of a global-positioning-system receiver or power of an active antenna of the global-positioning-system receiver. The network node uses the global-positioning-system receiver to perform synchronization of the network node. The method may also include receiving at least one measurement. The at least one measurement may include real-time, predictive, or historic data. The method may also include determining a holdover duration based on the at least one measurement. The holdover duration corresponds to a length of time where the power of the global-positioning-system receiver or the power of the active antenna is to be turned off. The method may also include deactivating the power of the global-positioning-system receiver or the power of the active antenna for the holdover duration.

In the method of the first embodiment, the network node may include a small-cell access point, evolved Node B, or a high altitude platform station.

In the method of the first embodiment, receiving the at least one measurement may include receiving internal, external, or predictive temperature measurements during holdover. The holdover duration is decreased if the temperature changes during holdover, and the holdover duration is increased if the measured temperature is constant during holdover.

In the method of the first embodiment, the receiving the at least one measurement may include receiving a measurement relating to at least one of a location of the network node, a velocity of the network node, an acceleration of the network node, a vibration influence on the network node, an environmental influence, a meteorological influence, and a global-positioning-system constellation location.

In the method of the first embodiment, the receiving the at least one measurement may include receiving a measurement relating to at least one of an amount of humidity, an amount of pollution, an amount of cloud cover, and an amount of solar flare activity.

In the method of the first embodiment, the receiving the at least one measurement may include receiving weather data. An amount of cloud cover is inversely related to the holdover duration. An amount of precipitation is inversely related to the holdover duration, and the holdover duration is determined based on which portion of the sky is obscured.

In the method of the first embodiment, the method may further include estimating an amount of time that is required for activating the power of the global-positioning-system receiver or the power of the active antenna, and for obtaining synchronization.

In the method of the first embodiment, the receiving the at least one measurement comprises receiving weather data, an amount of rain or snow is inversely related to the holdover duration, and the holdover duration is determined based on a barometric pressure.

In the method of the first embodiment, the holdover duration is determined based on a season or time of year, and an amount of foliage is inversely related to the holdover duration.

In the method of the first embodiment, the method may also include serving user equipment, wherein the holdover duration is determined based on a feature, application, or service used by the user equipment, or based on a location of the user equipment.

In the method of the first embodiment, an amount of cloud cover decreases the holdover duration by increasing a global-positioning-system synchronization time.

In the method of the first embodiment, a temperature difference away from an ideal temperature decreases the holdover duration by increasing a global-positioning-system synchronization time.

In the method of the first embodiment, a weak signal strength decreases the holdover duration by increasing a global-positioning-system synchronization time.

According to a second embodiment, an apparatus may include at least one processor. The apparatus may also include at least one memory including computer program code. The at least one memory and the computer program code may be configured, with the at least one processor, to cause the apparatus at least to activate power of a global-positioning-system receiver or power of an active antenna of the global-positioning-system receiver. The apparatus uses the global-positioning-system receiver to perform synchronization of the apparatus. The apparatus may also be caused to receive at least one measurement. The at least one measurement may include real-time, predictive, or historic data. The apparatus may also be caused to determine a holdover duration based on the at least one measurement. The holdover duration corresponds to a length of time where the power of the global-positioning-system receiver or the power of the active antenna is to be turned off. The apparatus may also be caused to deactivate the power of the global-positioning-system receiver or the power of the active antenna for the holdover duration.

In the apparatus of the second embodiment, the apparatus may include a small-cell access point, evolved Node B, or a high altitude platform station.

In the apparatus of the second embodiment, the receiving the at least one measurement includes receiving internal, external, or predictive temperature measurements during holdover. The holdover duration is decreased if the temperature changes during holdover, and the holdover duration is increased if the measured temperature is constant during holdover.

In the apparatus of the second embodiment, the receiving the at least one measurement may include receiving a measurement relating to at least one of a location of the apparatus, a velocity of the apparatus, an acceleration of the apparatus, a vibration influence on the apparatus, an environmental influence, a meteorological influence, and a global-positioning-system constellation location.

In the apparatus of the second embodiment, the receiving the at least one measurement may include receiving a measurement relating to at least one of an amount of humidity, an amount of pollution, an amount of cloud cover, and an amount of solar flare activity.

In the apparatus of the second embodiment, the receiving the at least one measurement may include receiving weather data. An amount of cloud cover is inversely related to the holdover duration. An amount of precipitation is inversely related to the holdover duration, and the holdover duration is determined based on which portion of the sky is obscured.

In the apparatus of the second embodiment, the apparatus may be further caused to estimate an amount of time that is required for activating the power of the global-positioning-system receiver or the power of the active antenna, and for obtaining synchronization.

In the apparatus of the second embodiment, the receiving the at least one measurement comprises receiving weather data, an amount of rain or snow is inversely related to the holdover duration, and the holdover duration is determined based on a barometric pressure.

In the apparatus of the second embodiment, the holdover duration is determined based on a season or time of year, and an amount of foliage is inversely related to the holdover duration.

In the apparatus of the second embodiment, the apparatus may be further caused to serve user equipment. The holdover duration is determined based on a feature, application, or service used by the user equipment, or based on a location of the user equipment.

In the apparatus of the second embodiment, an amount of cloud cover decreases the holdover duration by increasing a global-positioning-system synchronization time.

In the apparatus of the second embodiment, a temperature difference away from an ideal temperature decreases the holdover duration by increasing a global-positioning-system synchronization time.

In the apparatus of the second embodiment, a weak signal strength decreases the holdover duration by increasing a global-positioning-system synchronization time.

According to a third embodiment, a computer program product may be embodied on a non-transitory computer readable medium. The computer program product may be configured to control a processor to perform a method according to the first embodiment.

According to a fourth embodiment, an apparatus may include activating means that activates power of a global-positioning-system receiver or power of an active antenna of the global-positioning-system receiver. The apparatus uses the global-positioning-system receiver to perform synchronization of the apparatus. The apparatus may also include receiving means that receives at least one measurement. The at least one measurement may include real-time, predictive, or historic data. The apparatus may also include determining means that determines a holdover duration based on the at least one measurement. The holdover duration corresponds to a length of time where the power of the global-positioning-system receiver or the power of the active antenna is to be turned off. The apparatus may also include deactivating means that deactivates the power of the global-positioning-system receiver or the power of the active antenna for the holdover duration.

BRIEF DESCRIPTION OF THE DRAWINGS

For proper understanding of the invention, reference should be made to the accompanying drawings, wherein.

DETAILED DESCRIPTION

Certain embodiments of the present invention are directed to reducing an energy consumption when performing Radio Access Network (RAN) synchronization. Specifically, certain embodiments may reduce energy consumption by powering off devices and antennas to force holdover. Holdover is generally considered as an operating condition of a time-keeping device (such as a clock, for example) which has lost a controlling input, and the time-keeping device is instead using stored data to control an output. The stored data may be acquired while the time-keeping device is in a locked/synchronized operation. The stored data is used to control phase and frequency variations, allowing the locked condition to be reproduced within specifications. Holdover may begin when the output of the time-keeping device no longer reflects the influence of a connected external reference (where the connected external reference was previously the controlling input). Holdover terminates when the output of the time-keeping device reverts to a locked mode condition.

An adaptive algorithm may be implemented by certain embodiments in order to predict and/or maximize a length of time that holdover time-keeping devices and antennas are powered off, while maintaining the level of accuracy that is required for RAN operation or that is required by wireless standards.

There are an increasing number of small cell deployments where energy efficiency is important. When deploying High Altitude Platform Stations, efficient use of energy is very important. High Altitude Platform Stations (HAPS), such as drones or balloons that carry access points, are deployments whose operation is limited by an amount of solar-power generation capability during the day, and limited by an amount of battery storage capacity at night. Certain embodiments of the present invention may be applicable to deployments where energy efficiency is important.

Certain embodiments of the present invention may be also be applicable to terrestrial deployments, where the cost to generate power is high, and/or where $CO_2$ production that results from power generation may need to be minimized.

Certain embodiments of the present invention may reduce the amount of energy that is consumed by access points (for example, by small cell access points) that use Global Positioning System (GPS) for synchronization. Synchronization may refer to a process that enables the access points to operate within certain performance parameters. These access points may include HAPS.

Certain embodiments may reduce the amount of energy that is consumed by access points by using a plurality of real-time, predictive, and historic data to determine how long an access point can operate without the use of GPS. The real-time, predictive, and historic data may relate to factors that affect how long an internal time keeping device of an access point remains within a time synchronization specification. Predictive and historic data may relate to, for example, devices in use, environmental information, features in use, and/or user equipment locations.

According to certain embodiments, a GPS receiver of an access point may be intentionally powered off for a predicted duration, until a new synchronization reference needs to be obtained by the access point, via GPS. When a new synchronization reference is to be obtained, the GPS is then powered on for a short duration in order to receive the new synchronization reference. After obtaining the new synchronization reference from GPS, a new predicted duration (for powering off the access point) is computed, and the GPS receiver is intentionally disabled, repeating the process.

Certain embodiments of the present invention may reduce an energy that is consumed by (small cell) access points. The access points (such as HAPS) use GPS for synchronization by using a plurality of real-time, predictive, and historic data to continuously determine when an access point can operate without needing to power the active GPS receiver antennas of the access points. The plurality of real time, predictive, and historic data may include data relating to, for example, access point location and velocity, an acceleration of the access point, a vibration influence of the access point, environmental and meteorological influences at a present or future time, and/or GPS constellation locations at a present or future time.

Certain embodiments may turn off the power of an active GPS receiver during periods when the GPS receiver is not required, in order to reduce the energy that is consumed by the access point.

The previous approaches are directed to turning off parts of the GPS receiver, but not the entire GPS receiver. In contrast to the previous approaches, certain embodiments of the present invention are directed to a performing a forced holdover, powering off the entire GPS receiver, and implementing a synchronization algorithm to maximize power savings.

Certain embodiments of the present invention minimize the power that is used by a GPS receiver. Once an access point achieves an accurate synchronization via GPS, the GPS receiver of the access point is powered off to reduce the overall power of the access point. Although access points are specifically mentioned, other embodiments may turn off a GPS receiver of an evolved Node B (eNB) in order to conserve the eNB's power. Similar to access points, turning the power off for eNBs forces the eNBs into holdover. The period of time during which holdover is supposed to occur may be referred to as a holdover window. Before the holdover window expires, the power of the GPS receiver may be turned back on. Synchronization may be adjusted based on new GPS measurement data, and then the GPS receiver may be powered off again to save power. This cycle may continue indefinitely, for as long as the eNB requires GPS synchronization.

In order to maximize the holdover time, different variables may be used. As described above, synchronization may be adjusted. The size of the synchronization adjustment may be used to determine the holdover time. After the holdover window has expired, if the synchronization adjustment was very small, then the next holdover window (i.e., the duration of the next holdover time) tends to be increased. In other words, the size of the synchronization adjustment may be inversely related to the duration of the next holdover time. If the synchronization adjustment is large, then the next holdover window tends to be decreased. The synchronization adjustment is one input of many that can be used to predict/determine the next holdover time.

Temperature may also be used to calculate the duration of a holdover window and/or the duration of a holdover time. If the temperature during holdover is generally constant, the holdover window can be increased. If the temperature significantly changes during holdover, then the holdover window may be decreased. In other words, with certain embodiments, the magnitude of temperature change may be inversely related to the duration of the next holdover time.

In order to reduce the time for which the GPS receiver is powered up, many different measurements/variables may be considered. Weather data may be collected during the holdover window in order to determine how long it will take for the access point to reacquire a GPS signal after holdover. Because clear weather enables the access point to more quickly reacquire the GPS signal after holdover, clear weather allows the holdover window time to be increased. A clear view of the sky may allow a GPS receiver that has been recently powered on to collect satellite data more quickly. Cloudy weather or precipitation may increase the time for a GPS lock by the GPS receiver, which may require a shorter holdover window. The amount of cloudy weather or precipitation may be inversely related to the duration of a next holdover time. Precipitation may be rain or snow. The holdover time may also be based on a measured barometric pressure. The predicted location of a GPS constellation (such as a prediction relating to when a satellite will be visible) may also be used to determine an optimal holdover duration period. The holdover time may be determined based on which portion of sky is obscured because a satellite may be obscured.

Finally, with certain embodiments, the holdover time may be based on a season or time of year. The presence of foliage may increase a global-positioning-system synchronization time, decreasing the holdover duration.

Certain embodiments may determine an initial holdover as follows:

$$\text{Initial Holdover} = \frac{\left(\begin{array}{c}\text{Maximum Frequency Drift (measured in Hz)}\\ \text{that can support operation}\end{array}\right)}{\text{specified drift of reference oscillator (measured in Hz/Sec)}}$$

Certain embodiments may adjust a GPS synchronization time in accordance with the weather. For example, a cloud cover of X % may increase a GPS synchronization time by Y seconds.

Certain embodiments may adjust the GPS synchronization time in accordance with temperature. An additional drift (Hz/Sec) per degree (Celsius) away from the ideal temp T may increase or decrease synchronization time by DT (seconds).

Certain embodiments of the present invention may also minimize the power that is used by a GPS active antenna for small cell synchronization.

The GPS receiver includes the circuitry that is required to receive and decode GPS transmissions that are of sufficient strength or quality. The GPS receiver's active antenna increases the received signal strength or quality at the expense of additional energy consumption. The active antenna can be an external independent device, while the GPS receiver can be an internal independent (power-wise) component. Once synchronization is achieved, the active antenna that is used by the GPS receiver (of the access point) may be powered off to reduce an overall power consumption of the access point (e.g., eNB). Thus, the GPS receiver and/or the active antenna may be powered off. The entire access point (e.g., eNB) is not necessarily powered off.

With certain embodiments where holdover operation is forced to occur after turning off power to the active antenna, antenna power will remain off until just before the holdover window expires. After antenna power is restored, clock adjustments based on new GPS data may be performed to correct any synchronization drift that occurred during holdover. This cycle may continue indefinitely, for as long as the eNB requires GPS synchronization.

The GPS signal strength (received by the GPS receiver) may also be used to determine the holdover window. In some embodiments, a stronger signal strength may result in a shorter time to re-acquire synchronization, allowing the holdover window to be extended. In some embodiments, a weaker signal strength may result in a longer time to re-acquire synchronization, shortening the holdover window. The GPS signal strength may be one input of many that can be used to predict/determine the next holdover time.

With certain embodiments of the present invention, both the GPS Receiver and Active Antenna can be powered off to force a holdover. After the holdover window, either just the GPS receiver or both the GPS receiver and the active antenna may be powered up. The decision may be based on the current and/or predicted GPS signal strength. The active antenna can remain powered down indefinitely when the GPS signal strength is very high, such as when there is an unobstructed view of the sky. If synchronization is not possible with the active antenna powered off, then both the GPS receiver and the active antenna may be powered up after the holdover window expires.

In the event where only the GPS receiver is powered up, synchronization may not be possible. If the GPS receiver cannot acquire a sufficiently strong signal after a short period of time, the active antenna will also be powered up.

Figure 1:
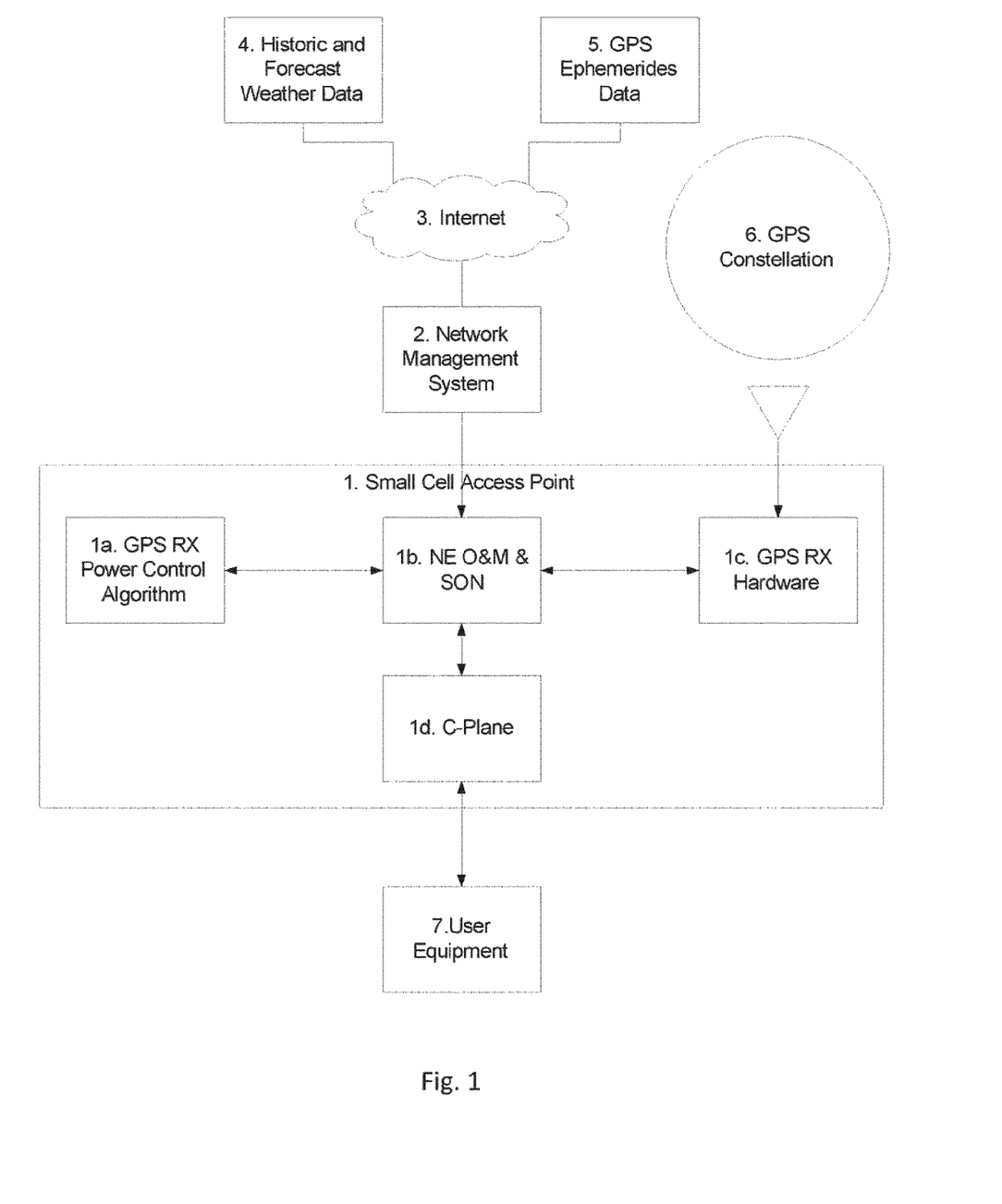
FIG. 1 illustrates a block diagram of a Global Positioning System (GPS) synchronized access point with certain embodiments of the present invention.

FIG. 1 illustrates a block diagram of a GPS synchronized access point with certain embodiments of the present invention. As described above, certain embodiments may use one or more historic and predicted environmental data to reduce the power that is consumed by an access point. The historic and predicted environmental data may relate to factors that affect the performance of the access point.

Referring to FIG. 1, the factors that affect the performance of the access point 1 may affect the accuracy of a GPS RX hardware 1c of the access point 1. With certain embodiments, access point 1 may be a small cell access point. The factors may include, but are not limited to, temperature, humidity, pollution, cloud cover, coronal mass ejections/solar flare activity, etc. The plurality of historical and predicted environmental data may be regularly obtained by the Network Management System 2 from a Historic Forecast Weather Data source 4, via the Internet 3. GPS Constellation information 6 may be obtained by GPS RX Hardware 1c. The historical and predicted environmental data may be obtained for a current or surrounding location (i.e., a latitude, a longitude, and/or an altitude) of the Access point 1.

Further, GPS ephemerides data may be regularly obtained by the Network Management System 2 from a GPS Ephemerides Data source 5, via the Internet 3.

On a regular basis, the Network Management System 2 may provide historic environmental data, predicted environmental data, and/or GPS ephemerides data to the Network Element (NE) Operation-and-Maintenance (O&M) & Self-Organizing-Networks (SON) element 1b of the Access point 1. The NE O&M & SON 1b may then forward the data to GPS RX Power Control Algorithm 1a. Control Algorithm may be implemented by a computer processor of access point 1, operating in conjunction with a non-transitory computer readable medium, for example.

On a regular basis, a Control Plane (C-Plane) 1d may provide a list of user equipment 7 that are operating in a location (such as on a cell edge, for example) that will affect how long the access point can operate with the GPS RX Hardware (1c) during holdover. C-Plane 1d may also provide a list of user equipment 7 that may use features of an evolved Multimedia Broadcast Multicast Services (eM-BMS) that will affect how long the access point can operate with the GPS RX Hardware 1c during holdover. The C-Plane 1d may provide the list to Network Element (NE) Operation and Maintenance (O&M) & Self Organizing Network (SON) 1b, which forwards the information to the GPS RX Power control algorithm 1a.

Figure 2A:
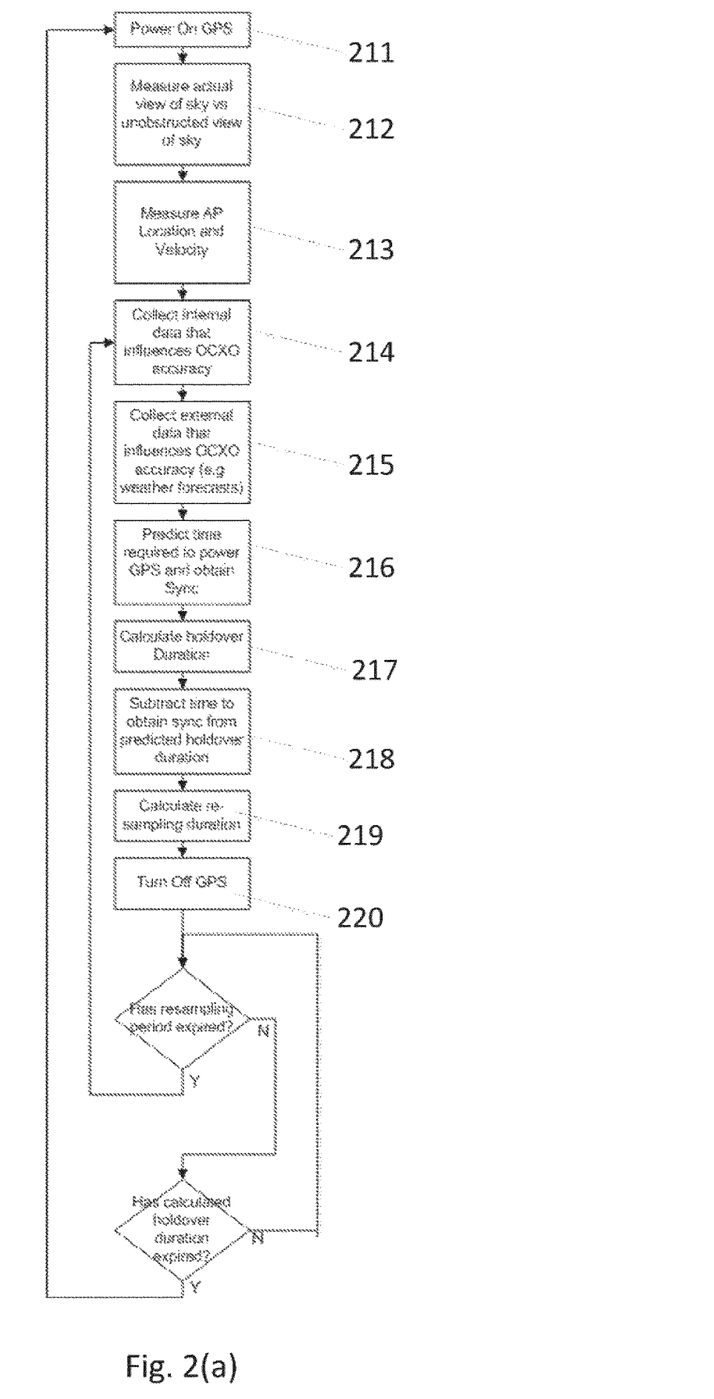
FIG. 2(a) illustrates a power saving algorithm for a GPS receiver, in accordance with certain embodiments.

FIG. 2(a) illustrates a power saving algorithm for a GPS receiver. The algorithm of FIG. 2(a) may be executed while the Access Point 1a is providing service to User Equipment 7. The power saving algorithm, at 211, may include turning on the power of the GPS receiver. The algorithm, at 212, may perform measurements relating to the actual view of the sky, in comparison to an unobstructed view of the sky. The algorithm, at 213, may determine/measure the access point's location and velocity. The algorithm, at 214, may also collect internal data that affects/influences the accuracy of the GPS RX hardware. The GPS RX hardware may include, for example, a oven-controlled-crystal-oscillator (OCXO). The algorithm, at 215, may also collect external data that affects/influences the accuracy of the GPS RX hardware. Using any of the above-described collected data, the algorithm, at 216, may predict a duration of time that is required to power the GPS receiver and to synchronize the access point. The algorithm, at 217, may then calculate/determine an appropriate holdover duration. As described in more detail below, the algorithm, at 218, may determine an amount of time that is required establish synchronization, and this time may be subtracted from the calculated holdover duration.

Next, the algorithm, at 219, may calculate a re-sampling duration. The resampling duration may correspond to the amount of time that elapses between different instances of collecting internal and/or external data, for example.

The algorithm, at 220, may turn off the GPS for a time corresponding to the calculated holdover duration.

On a regular basis, the power control algorithm of FIG. 2(a) can, optionally, provide feedback to the C-Plane with a list of features or UE Locations that can be barred to all the extensions of the time that the GPS RX Hardware can be turned off. Certain embodiments may prevent the use of these features or service to the UEs, in order to extend the holdover window instead of predicting the holdover. Certain embodiments may determine and/or extend a holdover duration based on a feature, application, or service used by the UEs.

Figure 2B:
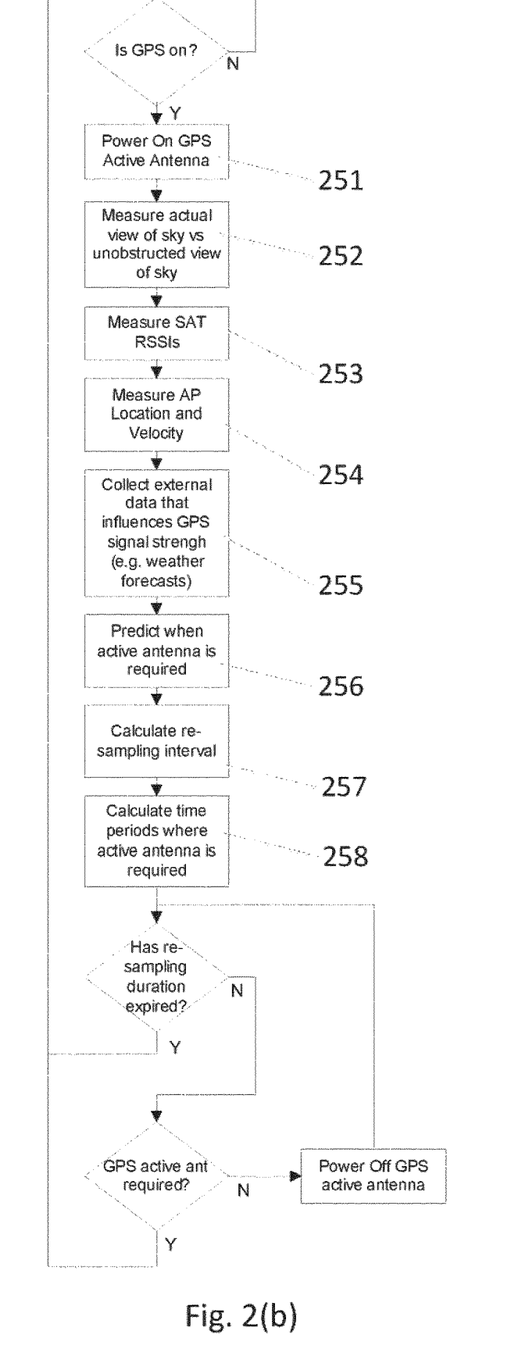
FIG. 2(b) illustrates a power saving algorithm for a receiving GPS active antenna.

FIG. 2(b) illustrates a power saving algorithm for a receiving GPS active antenna. As described above, in addition to saving power for GPS receivers, certain embodiments may also save power for active antennas of GPS receivers. The power saving algorithm of FIG. 2(b) may have similar features as compared to the power saving algorithm of FIG. 2(a). The power saving algorithm of FIG. 2(b) may include measuring a satellite received signal strength indicator (SAT RSSI). The power saving algorithm of FIG. 2(b) may also include calculating a re-sampling interval.

The algorithm, at 251, may include turning on the power of the GPS active antenna. The algorithm, at 252, may perform measurements relating to the actual view of the sky, in comparison to an unobstructed view of the sky. The algorithm, at 253, may measure SAT RSSIs. The algorithm, at 254, may measure the location and velocity of the access point. The algorithm, at 255, may also collect external data that affects/influences the GPS signal strength. Using any of the above-described collected data, the algorithm, at 256, may predict when an active antenna is required. The algorithm, at 257, may then calculate a resampling duration. The sampling duration may correspond to the amount of time that elapses between instances of performing measurements and collecting data, for example. The algorithm, at 258, may also calculate time periods where an active antenna is required.

In general, calculating the re-sampling interval may consider the relevant information available and compute the new interval. For example, each measurement type may have a specific influence on holdover time.

With the embodiment shown by FIG. 2(a), the calculation of holdover duration may begin with determining the base holdover duration that an oscillator can provide under ideal conditions. If a reference oscillator drifts at a rate of "X" Hz per degree of temperature (such as per Celsius degree, for example) away from the ideal operating frequency, then certain embodiments may compute how long holdover can last before requiring resynchronization. The resynchronization may be based on temperature. The duration of handover may also be adjusted based on the accuracy of previous predictions. Other measurements can further influence this interval. If there is poor weather, certain embodiments may compute how much additional time is required to establish synchronization, and the additional time may be subtracted from the predicted holdover time. If certain embodiments determine that no satellites will be in view when the interval expires, certain embodiments may calculate the latest possible time that resynchronization can occur and adjust the interval accordingly. There is a similar activity for the active antenna (e.g., the embodiment of FIG. 2(b), for example). Certain embodiments determine if use of the active antenna will be required for resynchronization, based on the information available.

The power saving algorithm of FIG. 2(b) also calculates time periods where an active antenna is required.

Certain use cases of certain embodiments may include solar-powered high altitude platforms. With solar-powered high altitude platforms, power may be required for both propulsion (in the case of drone operation), and for powering the small cell base stations that provide service. Certain embodiments may also be directed to use cases in areas where electric power is extremely expensive or use cases in areas where the carbon foot print or pollution that is produced by energy production needs to be curtailed.

Figure 3:
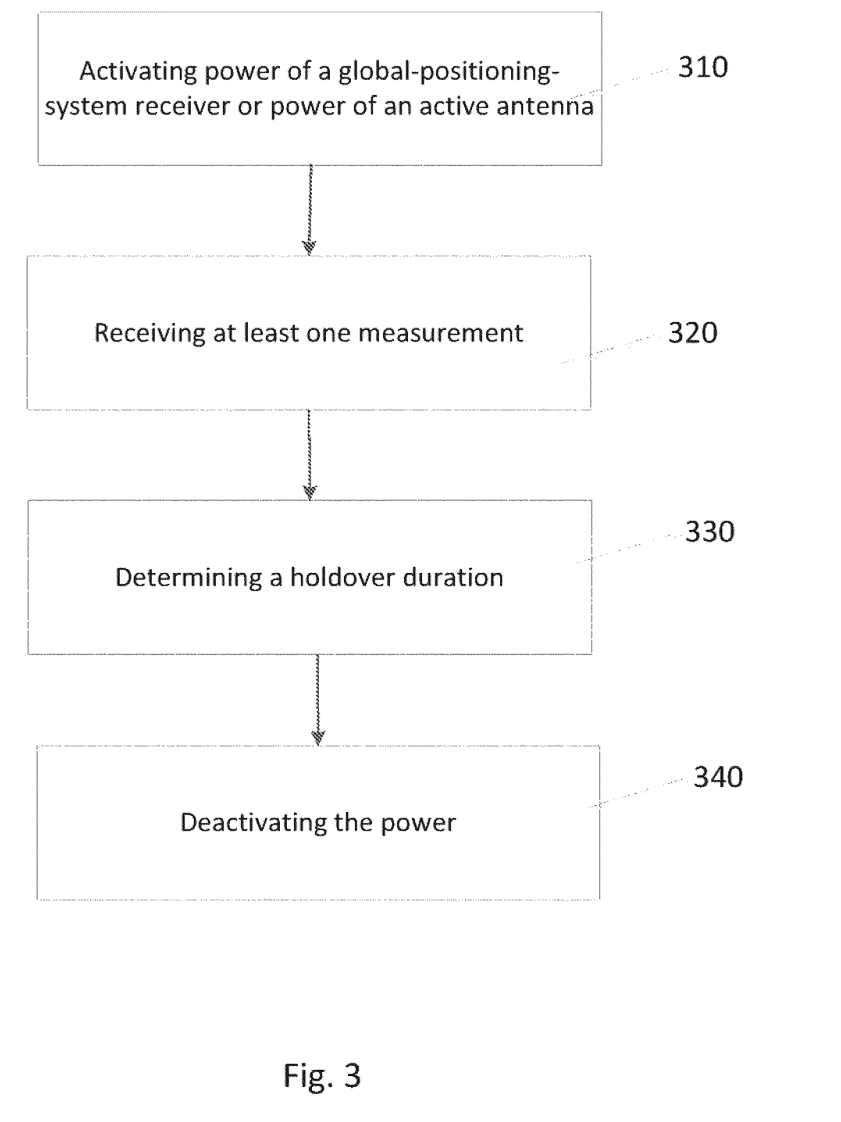
FIG. 3 illustrates a flowchart of a method in accordance with certain embodiments of the invention.

FIG. 3 illustrates a flowchart of a method in accordance with certain embodiments of the invention. The method illustrated in FIG. 3 includes, at 310, activating, by a network node, power of a global-positioning-system receiver or power of an active antenna of the global-positioning-system receiver. The network node uses the global-positioning-system receiver to perform synchronization of the network node. The method may also include, at 320, receiving at least one measurement. The at least one measurement comprises real-time, predictive, or historic data. The method may also include, at 330, determining a holdover duration based on the at least one measurement. The holdover duration corresponds to a length of time where the power of the global-positioning-system receiver or the power of the active antenna is to be turned off. The method may also include, at 340, deactivating the power of the global-positioning-system receiver or the power of the active antenna for the holdover duration.

Figure 4:
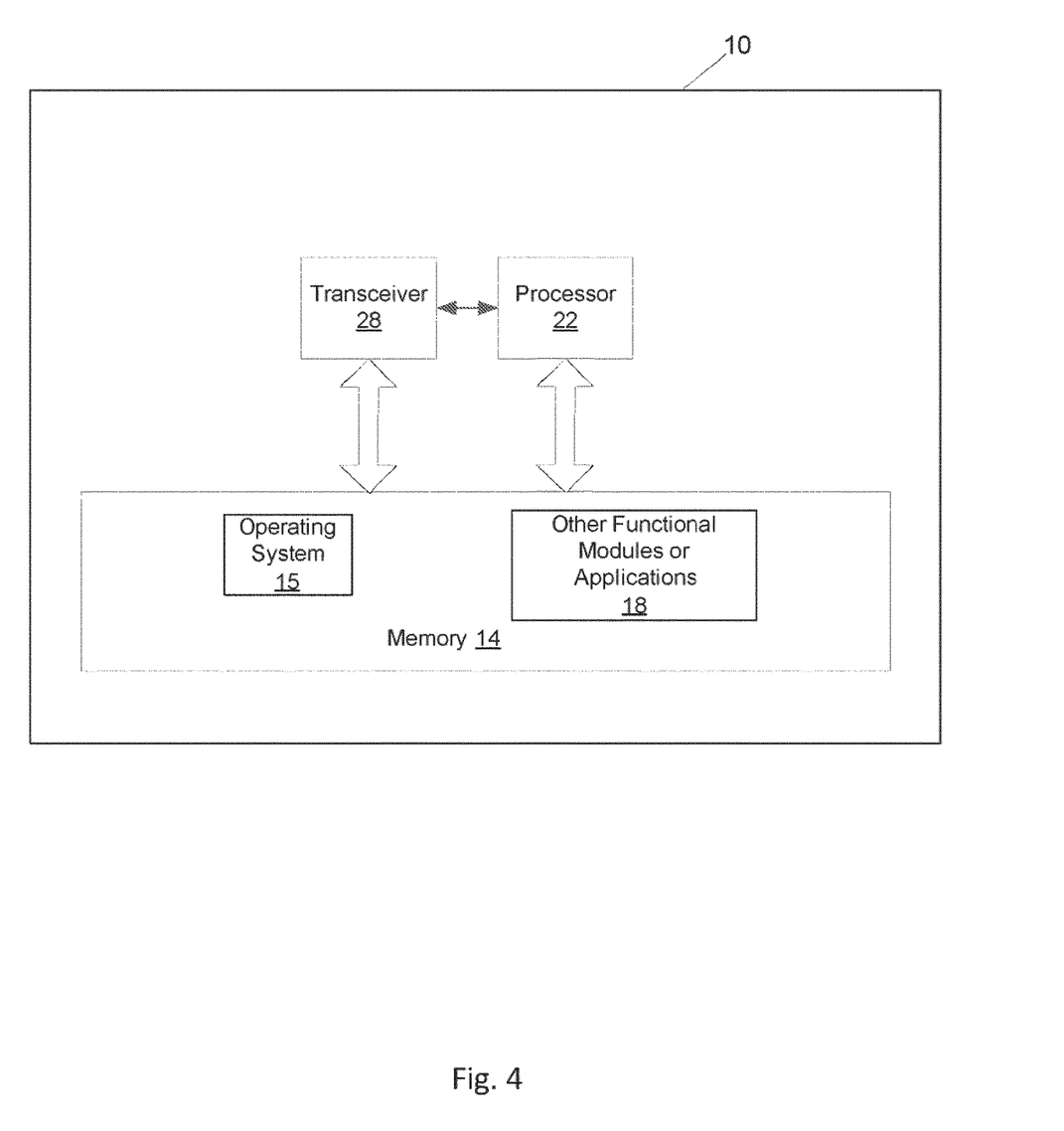
FIG. 4 illustrates an apparatus in accordance with certain embodiments of the invention.

FIG. 4 illustrates an apparatus 10 according to another embodiment. In an embodiment, apparatus 10 may be an access point, a small cell access point, a HAPS, and/or an evolved Node B, for example. In another embodiment, apparatus 10 may comprise a part of the access point.

Apparatus 10 includes a processor 22 for processing information and executing instructions or operations. Processor 22 may be any type of general or specific purpose processor. While a single processor 22 is shown in FIG. 4, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10.

The memory may also store one or more functional modules 18, such as an application or program, to provide additional functionality for apparatus 10. The components of apparatus 10 may be implemented in hardware, or as any suitable combination of hardware and software.

In one embodiment, apparatus 10 may be configured to activate power of a global-positioning-system receiver or power of an active antenna of the global-positioning-system receiver. Apparatus 10 uses the global-positioning-system receiver to perform synchronization of apparatus 10. Apparatus 10 may also be configured to receive at least one measurement. The at least one measurement comprises real-time, predictive, or historic data. Apparatus 10 may also be configured to determine a holdover duration based on the at least one measurement. The holdover duration corresponds to a length of time where the power of the global-positioning-system receiver or the power of the active antenna is to be turned off. Apparatus 10 may also be configured to deactivate the power of the global-positioning-system receiver or the power of the active antenna for the holdover duration.

Figure 5:
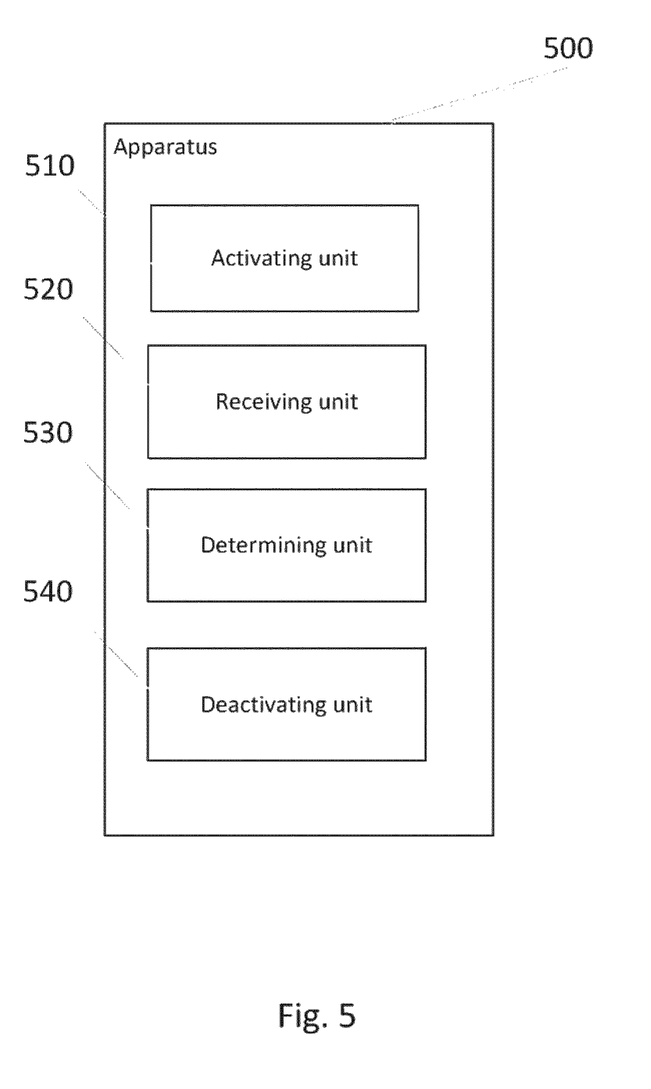
FIG. 5 illustrates another apparatus in accordance with certain embodiments of the invention.

FIG. 5 illustrates another apparatus in accordance with certain embodiments of the invention. Apparatus 500 can be an access point and/or an eNB, for example. Apparatus 500 can include an activating unit 510 that activates power of a global-positioning-system receiver or power of an active antenna of the global-positioning-system receiver. Apparatus 500 uses the global-positioning-system receiver to perform synchronization of apparatus 500. Apparatus 500 may also include receiving unit 520 that receives at least one measurement. The at least one measurement comprises real-time, predictive, or historic data. Apparatus 500 may also include a determining unit 530 that determines a holdover duration based on the at least one measurement. The holdover duration corresponds to a length of time where the power of the global-positioning-system receiver or the power of the active antenna is to be turned off. Apparatus 500 may also include a deactivating unit 540 that turns off the power of the global-positioning-system receiver or the power of the active antenna for the holdover duration.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:

activating, by a network node, power of a global-positioning-system receiver or power of an active antenna of the global-positioning-system receiver, wherein the network node uses the global-positioning-system receiver to perform synchronization of the network node;

receiving environmental data, wherein the environmental data comprises real-time, predictive, or historic data for at least an environment in which the network node resides, in which at least part of the environmental data is received by the network node from another network node, wherein the receiving the environmental data comprises receiving a measurement relating to at least one of an amount of humidity, an amount of pollution, an amount of cloud cover, or an amount of solar flare activity;

determining a holdover duration based on the environmental data, wherein the holdover duration corresponds to a length of time where the power of the global-positioning-system receiver or the power of the active antenna is to be turned off, wherein the holdover duration is based at least in part on a synchronization time it took the global-positioning-system receiver to produce a synchronization reference, and wherein the holdover duration varies inversely with the synchronization time; and deactivating the power of the global-positioning-system receiver or the power of the active antenna for at least the holdover duration.

2. The method according to claim 1, wherein the network node comprises a small-cell access point, evolved Node B, or a high altitude platform station.

3. The method according to claim 1, wherein the receiving the environmental data comprises receiving a measurement relating to at least one of a location of the network node, a velocity of the network node, an acceleration of the network node, a vibration influence on the network node, an environmental influence, a meteorological influence, and a global-positioning-system constellation location.

4. The method according to claim 1, wherein the receiving the environmental data comprises receiving weather data, and wherein one or more of the following are used to determine the holdover duration: an amount of cloud cover increases the synchronization time and causes the holdover duration to be decreased.

5. The method according to claim 1, further comprising estimating an amount of time that is required for activating the power of the global-positioning-system receiver or the power of the active antenna, and for obtaining the synchronization time.

6. The method according to claim 1, wherein the receiving the environmental data comprises receiving weather or other data, and wherein one or more of the following are used to determine the holdover duration: an amount of rain or snow increases the synchronization time and causes the holdover duration to be decreased, or the holdover duration is determined based on a barometric pressure and a corresponding change in the synchronization time, or an amount of foliage increases the synchronization time and causes the holdover duration to be decreased.

7. The method according to claim 1, further comprising serving user equipment, wherein the holdover duration is determined based on a feature, application, or service used by the user equipment, or based on a location of the user equipment.

8. The method according to claim 1, wherein a weak signal strength decreases the holdover duration by increasing the synchronization time.

9. The method according to claim 1, wherein a size of a synchronization adjustment for a previous adjustment of the synchronization time is used to determine a next holdover duration, and the size of the synchronization adjustment is inversely related to a duration of the next holdover duration.

10. The method according to claim 1, wherein the determining the holdover duration uses a temperature difference away from a particular temperature to decrease the holdover duration by increasing the synchronization time.

11. The method according to claim 1, wherein the receiving the environmental data comprises receiving weather data, and wherein an amount of precipitation increases the synchronization time and causes the holdover duration to be increased.

12. An apparatus, comprising:
   at least one processor; and
   at least one memory including computer program code, the at least one memory and the computer program code configured, with the at least one processor, to cause the apparatus at least to
   activate power of a global-positioning-system receiver or power of an active antenna of the global-positioning-system receiver, wherein the apparatus uses the global-positioning-system receiver to perform synchronization of the apparatus;
   receive environmental data, wherein the environmental data comprises real-time, predictive, or historic data for at least an environment in which the network node resides, in which at least part of the environmental data is received by the network node from another network node, wherein the receiving the environmental data comprises receiving a measurement relating to at least one of an amount of humidity, an amount of pollution, an amount of cloud cover, or an amount of solar flare activity;
   determine a holdover duration based on the environmental data, wherein the holdover duration corresponds to a length of time where the power of the global-positioning-system receiver or the power of the active antenna is to be turned off, wherein the holdover duration is based at least in part on a synchronization time it took the global-positioning-system receiver to produce a synchronization reference, and wherein the holdover duration varies inversely with the synchronization time; and
   deactivate the power of the global-positioning-system receiver or the power of the active antenna for at least the holdover duration.

13. The apparatus according to claim 12, wherein the receiving the environmental data comprises receiving a measurement relating to at least one of a location of the apparatus, a velocity of the apparatus, an acceleration of the apparatus, a vibration influence on the apparatus, an environmental influence, a meteorological influence, and a global-positioning-system constellation location.

14. The apparatus according to claim 12, wherein the receiving the environmental data comprises receiving weather data, and wherein one or more of the following are used to determine the holdover duration: an amount of cloud cover increases the synchronization time and causes the holdover duration to be decreased, or an amount of precipitation increases the synchronization time and causes the holdover duration to be increased.

15. The apparatus according to claim 12, wherein the apparatus is further caused to estimate an amount of time that is required for activating the power of the global-positioning-system receiver or the power of the active antenna, and for obtaining the synchronization time.

16. The apparatus according to claim 12, wherein the receiving the environmental data comprises receiving weather or other data, and wherein one or more of the following are used to determine the holdover duration: an amount of rain or snow increases the synchronization time and causes the holdover duration to be decreased, or the holdover duration is determined based on a barometric pressure and a corresponding change in the synchronization time, or an amount of foliage increases the synchronization time and causes the holdover duration to be decreased.

17. The apparatus according to claim 12, wherein the apparatus is further caused to serve user equipment, wherein the holdover duration is based on a location of the user equipment and the location's corresponding effect on the synchronization time.

18. The apparatus according to claim 12, wherein a weak signal strength decreases the holdover duration by increasing the synchronization time.

19. A computer program product, embodied on a non-transitory computer readable medium, the computer program product configured to control a processor to perform at least the following:
   activating, by a network node, power of a global-positioning-system receiver or power of an active antenna of the global-positioning-system receiver, wherein the network node uses the global-positioning-system receiver to perform synchronization of the network node;
   receiving environmental data, wherein the environmental data comprises real-time, predictive, or historic data for at least an environment in which the network node resides, in which at least part of the environmental data is received by the network node from another network node, wherein the receiving the environmental data comprises receiving a measurement relating to at least one of an amount of humidity, an amount of pollution, an amount of cloud cover, or an amount of solar flare activity;
   determining a holdover duration based on the environmental data, wherein the holdover duration corresponds to a length of time where the power of the global-positioning-system receiver or the power of the active antenna is to be turned off, wherein the holdover duration is based at least in part on a synchronization time it took the global-positioning-system receiver to produce a synchronization reference, and wherein the holdover duration varies inversely with the synchronization time; and
   deactivating the power of the global-positioning-system receiver or the power of the active antenna for at least the holdover duration.

* * * * *